UNITED STATES PATENT OFFICE.

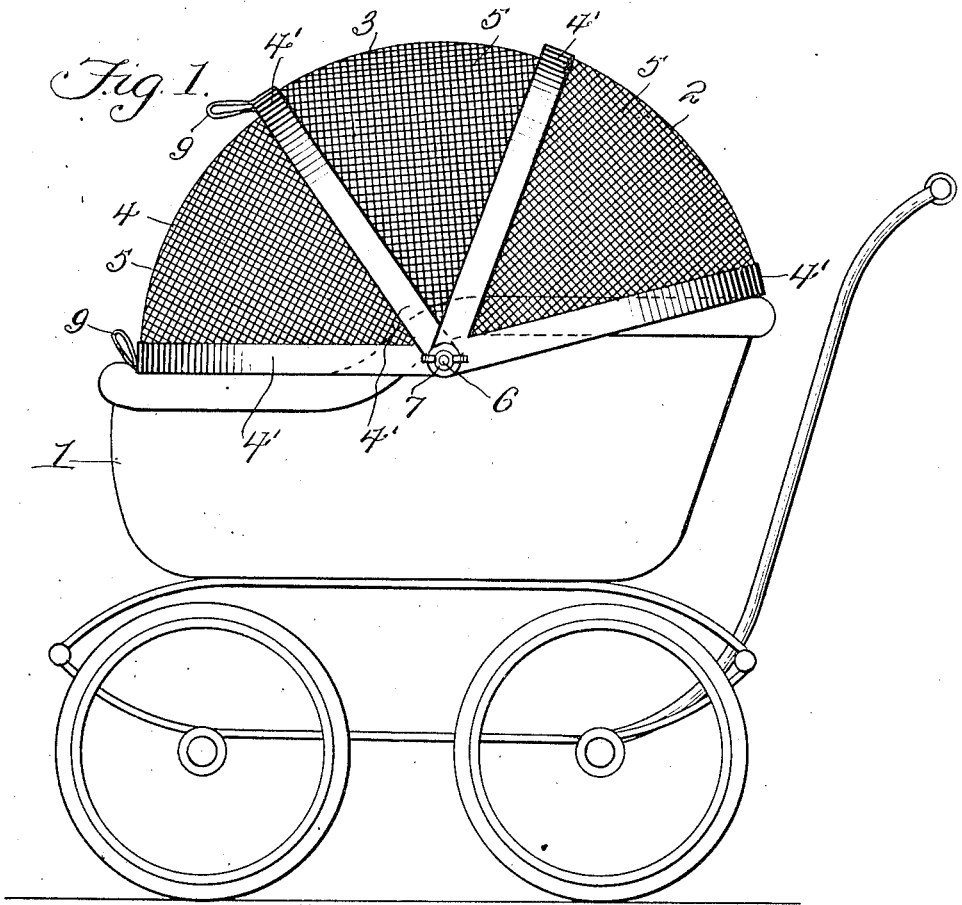
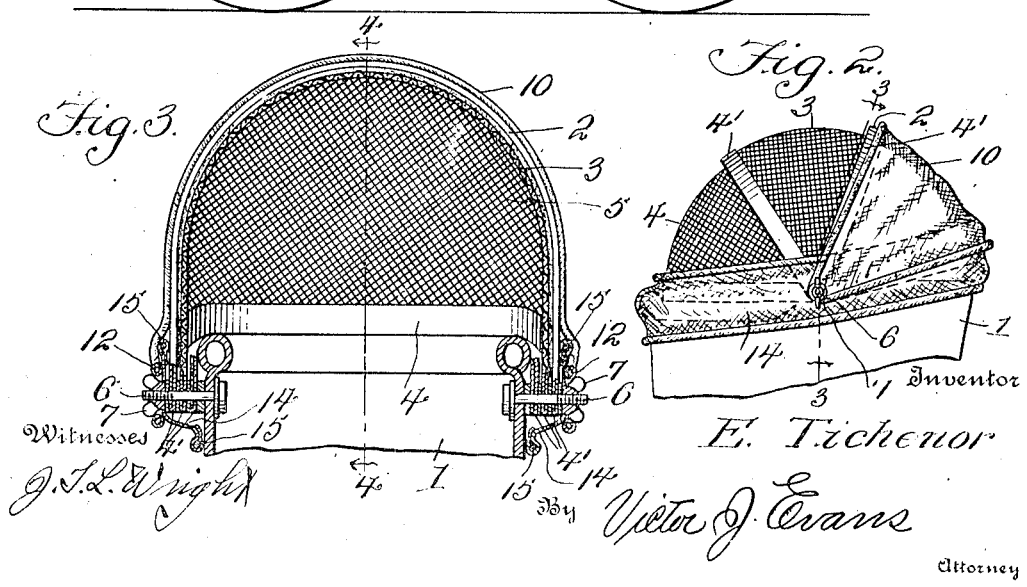

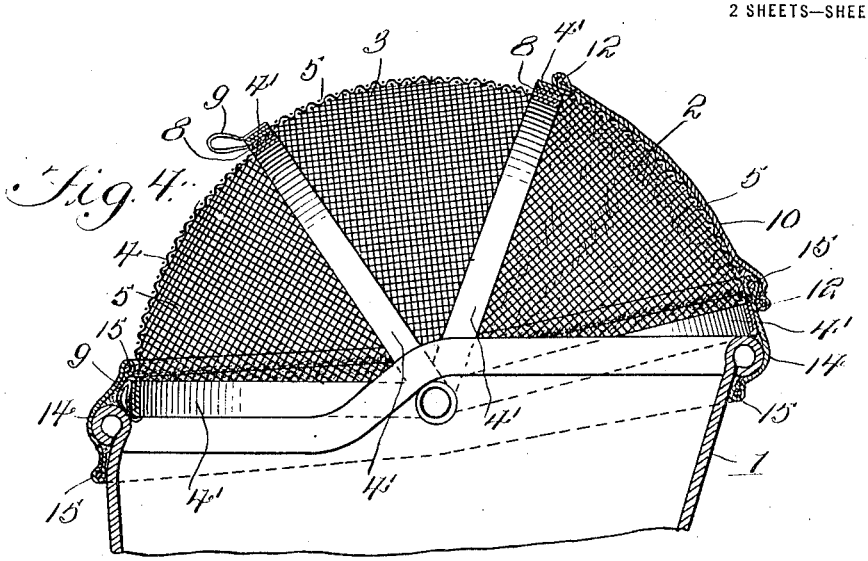
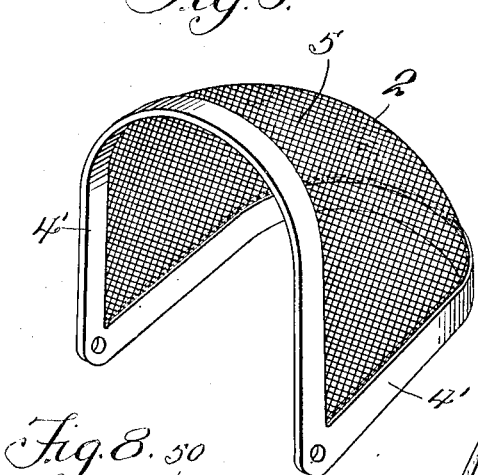
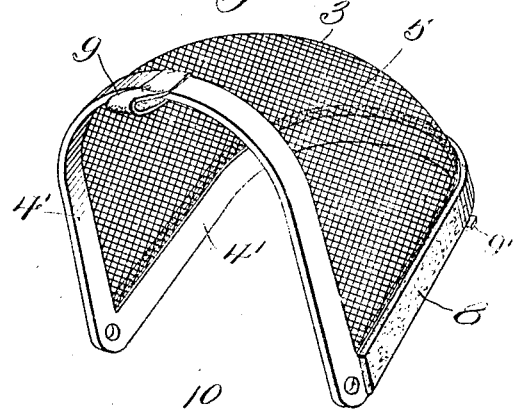
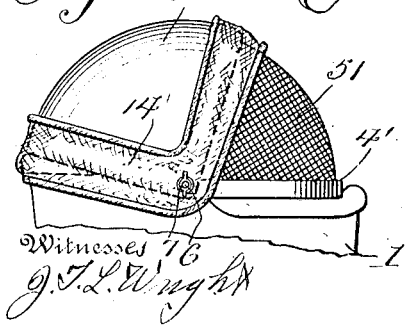

ELLA TICHENOR, OF BROOKLYN, NEW YORK.

CANOPY.

1,289,965.  Specification of Letters Patent.  Patented Dec. 31, 1918.

Application filed July 24, 1918. Serial No. 246,565.

*To all whom it may concern:*

Be it known that I, ELLA TICHENOR, a citizen of the United States, residing at Brooklyn, in the county of Kings and State of New York, have invented new and useful Improvements in Canopies, of which the following is a specification.

This invention has reference to baby carriages and is particularly directed to a hood or canopy therefor.

The primary object of the invention is to produce a canopy made up of a plurality of arched telescopic sections, each including a frame having a facing of wire mesh, means being provided whereby the sections may be swung on a common pivot one outward or inward of the other so as to wholly or partly cover the carriage, means being also provided whereby a tight joint is effected between the sections to prevent the entrance of insects therebetween.

A further object of the invention is to produce a canopy which may be employed in connection with ordinary hoods on baby carriages, comprising a plurality of reticulated sections each connected to a common pivot and foldable one in the other when not in use, the outer sections being provided with tabs or handles whereby the same may be swung outwardly or moved inwardly with respect to the remaining sections, when desired, means being provided for surrounding the edges of the sections when the latter are in their open position, to provide a tight joint between the canopy and the baby carriage, and means being also provided for covering one of the reticulated sections.

It is a still further object of the invention to produce a telescopic or foldable canopy for baby carriages which shall be of a simple but strong construction so that the same will not only protect the occupant of the carriage from insects but will also serve as a protector from small animals or from missiles.

Other objects and advantages will appear as the nature of the invention is better understood, reference being had to the accompanying drawings, in which:
Figure 1 is a side elevation of a baby carriage provided with the improvement;

Fig. 2 is a similar view showing one of the sections of the hood provided with a removable cover or facing and the body of the carriage provided with a continuous element for closing the gap between the edges of the canopy and the baby carriage;

Fig. 3 is a transverse sectional view approximately on the line 3—3 of Fig. 2;

Fig. 4 is a longitudinal sectional view approximately on the line 4—4 of Fig. 2;

Fig. 5 is a perspective view of the outer section;

Fig. 6 is a similar view of one of the end or intermediate sections of the canopy;

Fig. 7 is a perspective view of the fabric cover or facing for the outer canopy section;

Fig. 8 is a side elevation showing a fabric shield arranged to close the joints between the body of the carriage, the hood and the perforated canopy.

The body of the baby carriage is indicated by the numeral 1, the same being of any ordinary construction.

While not illustrated by the drawings, the ordinary arched hood for the carriage may be employed, if desired. Preferably, however, and as illustrated by the drawings, the hood or canopy for the carriage body is constructed wholly of reticulated sections.

As disclosed by the drawings the canopy comprises three separate sections, the outer section, for distinction being indicated by the numeral 2, the intermediate section by the numeral 3, and the remaining section by the numeral 4.

Each of the sections has its sides V-shaped in plan and its top arched both transversely and longitudinally. Each of the sections includes a frame which comprises two angularly disposed arched or bowed members 4'—4', the ends of the same being connected, but which are gradually spaced away from each other from their said connected ends. Preferably the bows 4' are constructed of sheets of metal which are bent upon themselves to receive therebetween a facing of reticulated material, such as wire mesh 5. The lapping portions of the bows are connected together to effectively clamp therebetween the mesh 5, but the connecting means is such as to present no lugs or obstructions upon the inner faces of the bows.

The ends of all of the sections are connected by common pivots 6, which may be in the nature of ordinary bolts secured to the upper edges on the sides of the body 1, the said bolts being engaged by removable ends 7.

The rear bows of the frames for the intermediate section 3, and the inner section 4 have an outer facing of compressible material, which is indicated by the numerals 8, and this material, contacting with the inner surfaces of the sections with which they are engaged provide a tight joint between the sections. Also, if desired, the said sections 3 and 4 may be provided with means, such as lugs 9' that contact with the inner edges of the outer bows of the frames of the sections in which they are foldable, to prevent said sections being wholly removed, one from the other.

The outer bows of the frames of the sections 3 and 4 are provided with tabs 9, and these tabs are in the nature of handles permitting the ready telescoping or outward movement of the section 4 with relation to the section 3, and the section 3 with relation to the section 2.

The section 2 may be provided with an outer facing which is indicated by the numeral 10, the same being preferably constructed of some suitable textile material, and the edges of the same have embedded therein elastic tapes 12. The cover or facing conforms to the shape of the section 2, so that the sides thereof are substantially V-shaped, and these sides, at the ends thereof are provided with openings 13 through which pass the pivot bolts, while the clamping nuts contacting with the outer surface of the cover or facing effectively retains the ends thereof on the canopy section 2.

The body 1 of the carriage may be surrounded by a fabric which is indicated by the numeral 14, the opposite edges of the same being gathered for the reception of elastic tapes 15—15, and the member 14 is adapted to be arranged over the edges of the canopy when the canopy is in its spread position and as illustrated in Fig. 2 of the drawings.

In Fig. 8 a fabric wind shield 14' is arranged between the joints of the ordinary pivoted hood 50 for the baby carriage, the joint between the said hood and the reticulated canopy 51 and the joint between the said hood and the body of the carriage.

Having thus described the invention, what I claim is:

In a canopy for baby carriages or the like, the combination with a carriage having a pivot member extending laterally from each of the sides thereof, said canopy comprising a plurality of telescopic sections having bowed tops and substantially V-shaped sides, each of the sides, at the apex thereof having an opening receiving the pivot members of the carriage, means for securing said sections on said pivots, each of said sections having a covering of reticulated material, compressible means between the sections providing a tight joint therebetween, tabs on the outer edges of certain of the sections, a protective cover for one of the sections designed to be connected with the pivots, elastic means for holding such cover in frictional contact with said section, a facing surrounding the carriage body, an elastic means on the edges of the casing to hold the same against the canopy when the sections thereof are in spread condition.

In testimony whereof I affix my signature.

ELLA TICHENOR.